United States Patent [19]

Bulla et al.

[11] Patent Number: 5,046,322
[45] Date of Patent: Sep. 10, 1991

[54] ELECTRONIC REFRIGERANT TRANSFER SCALE

[75] Inventors: Don A. Bulla, Bryan; Byron J. Dunham, Sherwood; Gary P. Murray, Montpelier, all of Ohio

[73] Assignee: Kent-Moore Corporation, Warren, Mich.

[21] Appl. No.: 348,555

[22] Filed: May 8, 1989

[51] Int. Cl.$^5$ ............................................. F25B 49/00
[52] U.S. Cl. ..................................... 62/126; 62/149; 62/292; 177/127
[58] Field of Search ................... 62/149, 77, 292, 126; 141/231, 66; 177/127

[56] References Cited

U.S. PATENT DOCUMENTS

| | | | |
|---|---|---|---|
| 783,329 | 2/1905 | Sweet | 177/127 |
| 997,091 | 7/1911 | Reichmann | 177/127 |
| 2,386,765 | 10/1945 | Adams et al. | 137/533.11 X |
| 2,884,223 | 4/1959 | Cooksley | 137/533.11 X |
| 3,976,110 | 8/1976 | White | 62/77 X |
| 4,624,112 | 11/1986 | Proctor | 62/149 |
| 4,688,388 | 8/1987 | Lower et al. | 62/149 X |
| 4,938,031 | 7/1990 | Manz et al. | 62/292 X |
| 4,939,905 | 7/1990 | Manz | 62/292 X |

OTHER PUBLICATIONS

Control Power Systems, Inc. (catalog page).
TIF Instruments, Inc. (catalog page).

Primary Examiner—William E. Wayner
Attorney, Agent, or Firm—Barnes, Kisselle, Raisch, Choate, Whittemore & Hulbert

[57] ABSTRACT

An electronic scale assembly for transferring refrigerant charge between a tank and refrigeration equipment under service comprises a generally rectangular enclosure that includes a handle positioned along one side edge of the enclosure for manually transporting the scale, and a cover for selectively opening and closing the enclosure. A scale includes a platform mounted within the enclosure at a position to support a refrigerant tank when the cover is open, and a strain gage sensor for providing an electrical signal as function of weight supported by the platform. A solenoid-operated refrigerant transfer valve is mounted within the enclosure for connection between a tank mounted on the scale platform and refrigeration equipment under service for selectively transferring refrigerant between the tank and the equipment through the valve. An electronic controller is responsive to the electrical scale signal for indicating weight of refrigerant transferred through the valve. The electronic controller includes facility for operator programming of a selected charge transfer quantity, opening the solenoid valve upon initiation of a charging operation, and monitoring the scale signal for automatically closing the transfer valve responsive to a change in the scale signal corresponding to the programmed transfer refrigerant quantity.

11 Claims, 7 Drawing Sheets

ELECTRONIC REFRIGERANT TRANSFER SCALE

Reference is made to a microfiche appendix to this application consisting of one sheet of fiche bearing twenty-six frames.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The present invention is directed to maintenance of refrigeration equipment, and more particularly of a device for controlled transfer of refrigerant between equipment to be serviced and a storage tank.

BACKGROUND AND OBJECTS OF THE INVENTION

U.S. Pat. No. 4,688,388, assigned to the assignee hereof, discloses apparatus for service and recharge of refrigeration equipment, with particular application to automotive air conditioning equipment. A vacuum pump and a refrigerant charge container are housed within a wheel-mounted cabinet and configured for selective connection, by electrically operated solenoid valves and hoses carried by the cabinet, to refrigeration equipment under service. The refrigerant container is carried by a scale that provides electrical output signals as a function of weight of refrigerant remaining in the container. A microprocessor-based controller receives the scale signals and control signals from an operator panel for automatically cycling through vacuum and refrigerant charge stages in a programmed mode of operation. The microprocessor-based controller includes an alphanumeric keypad for operator programming of vacuum time and refrigerant charge quantities, an alphanumeric digital display for indicating vacuum time and charge quantities, and facility for self- or operator-implemented diagnostics. Operating conditions and stages are displayed to the operator.

U.S. Pat. No. 4,768,347, also assigned to the assignee hereof, discloses a refrigerant recovery system that includes a compressor having an input coupled through an evaporator and through a solenoid valve to the refrigeration equipment from which refrigerant is to be withdrawn, and an output coupled through a condenser to a refrigerant storage container or tank. The evaporator and condenser are contained within a closed cylindrical canister for heat exchange and oil separation, the canister having an oil drain in the bottom. The refrigerant storage container is carried by a scale having a limit switch coupled to the control electronics to prevent or terminate further refrigerant recovery when the container is full. The scale comprises a platform pivotally mounted by a hinge pin to a wheeled cart that also carries the evaporator/condenser unit, the compressor, control electronics, and associated valves and hoses.

U.S. application Ser. No. 157,579, filed Feb. 19, 1988 and assigned to the assignee hereof, now U.S. Pat. No. 4,805,416 discloses systems for recovering, purifying and recharging refrigerant in which, during a purification cycle, refrigerant is circulated from the refrigerant storage container in a closed path through a circulation valve and a filter for removing water and other contaminants, and then returned to the container. U.S. application Ser. No. 263,887 filed Oct. 28, 1988 now U.S. Pat. No. 4,878,356 and also assigned to the assignee hereof, discloses a refrigerant recovery system that includes a refrigerant storage container, refrigeration circuitry for withdrawing refrigerant from equipment to be serviced and feeding such refrigerant to the container for storage, and a scale supporting the container for sensing impending overfill of the container. The scale includes a beam horizontally rigidly cantilevered from a base. A switch is positioned adjacent to the cantilever-remote end of the beam, and is responsive to deflection of the beam to indicate impending overfill of the container and prevent or terminate operation of the refrigerant recovery system.

The refrigerant recovery and/or charging systems disclosed in the above-noted patents and applications are primarily designed and intended for use as integral or complete service systems in the environment of service stations of substantial size, and have enjoyed substantial commercial acceptance and success in such environments. However, there remains a need in the art for a simple and economical electronic scale that may be employed by service operators who already have substantial recovery and recharging equipment, who do not wish to purchase redundant equipment, and yet who desire to have automated refrigerant transfer in terms for programming and automatic-operation capability. There is also a need in the art for a compact, economical and easily portable electronic scale that may be readily transported by a refrigeration service technician to a job site, and may be employed by the technician with little advance training, for recovering refrigerant from the equipment under service and/or recharging the equipment with fresh refrigerant. It is an object of the present invention to provide an electronic refrigerant transfer scale that satisfies these needs.

SUMMARY OF THE INVENTION

An electronic scale for transferring refrigerant between a tank and refrigeration equipment under service, in accordance with a presently preferred embodiment of the invention, comprises a generally rectangular enclosure that includes a handle positioned along one side edge of the enclosure for manually transporting the scale, and a cover for selectively opening and closing the enclosure. A platform is mounted within the enclosure at a position to support a refrigerant tank when the cover is opened, and a scale sensor provides an electrical signal as function of weight supported by the platform. A refrigerant transfer valve is mounted within the enclosure for connection between a tank mounted on the scale platform and refrigeration equipment under service for selectively transferring refrigerant between the tank and the equipment through the valve. An electronic controller is responsive to the electrical scale signal for indicating weight of refrigerant transferred through the valve. Preferably, the transfer valve comprises a solenoid valve, and the electronic controller includes facility for operator programming of a selected charge transfer quantity, opening the solenoid valve upon initiation of a charging operation, and monitoring the scale signal for automatically closing the transfer valve responsive to a change in the scale signal corresponding to the programmed transfer refrigerant quantity.

The electronic controller in the preferred embodiment of the invention is microprocessor-based and includes an alphanumeric keypad responsive to an operator for entering the selected charged transfer quantity.

An alphanumeric digital display indicates program quantity during a programming mode of operation, and transfer quantity during a transfer mode of operation. The controller is also responsive to the keypad for opening the solenoid valve and transferring refrigerant between the equipment and the tank independently of the scale signal in a manual transfer mode of operation. The scale includes a support and a beam cantilevered from the support, with the platform being carried at the support-remote end of the beam. A strain gage sensor is carried by the beam for providing the electrical scale signal as a function of stress in the beam. The enclosure includes an open rectangular base with an operator panel that encloses the beam, controller and transfer valve within the base, while exposing the keypad and display for operator access. The cover is also of open rectangular construction, being connected to the base along one side edge by a suitable hinge, and including a latch at the opposing side edge.

A check valve is associated with the transfer valve for preventing reverse flow of refrigerant between the tank and the equipment under service. Hoses selectively connect the transfer valve and the check valve between the tank and the equipment under service for either transferring refrigerant from the tank to charge the equipment or transferring refrigerant to the tank to recover refrigerant from the equipment. The check valve includes a hollow tubular fitting having external male threads at opposed axial ends and a passage extending axially therethrough. A pin extends through the passage and is spaced from a conical shoulder formed in the passage. A ball valve element is captured between the pin and shoulder, being movable against the pin for permitting flow of refrigerant through the valve in the corresponding direction, but seating against the shoulder to prevent flow of refrigerant in the reverse direction.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENT

Figure 1:
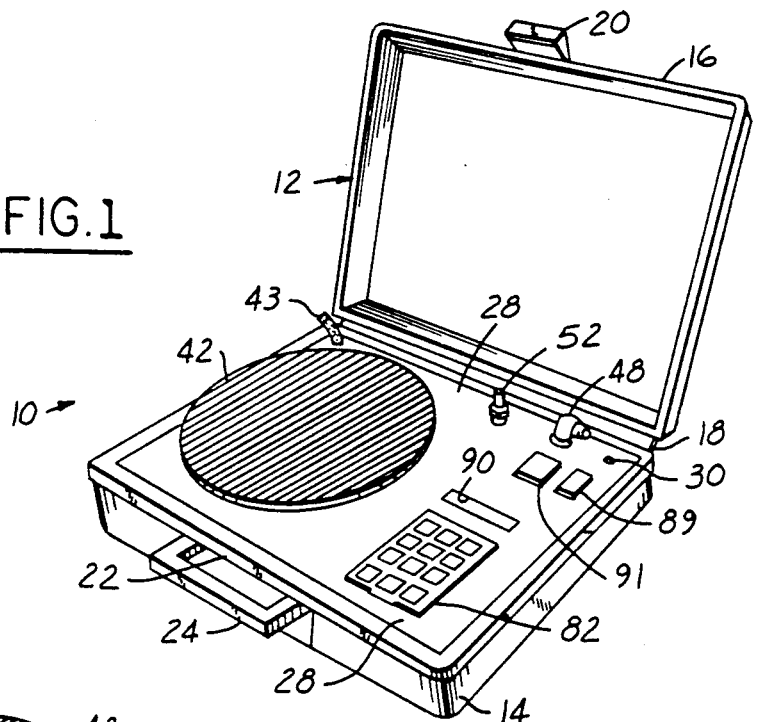
FIG. 1 is a perspective view of an electronic refrigerant transfer scale in accordance with a presently preferred embodiment of the invention.
Figure 2:
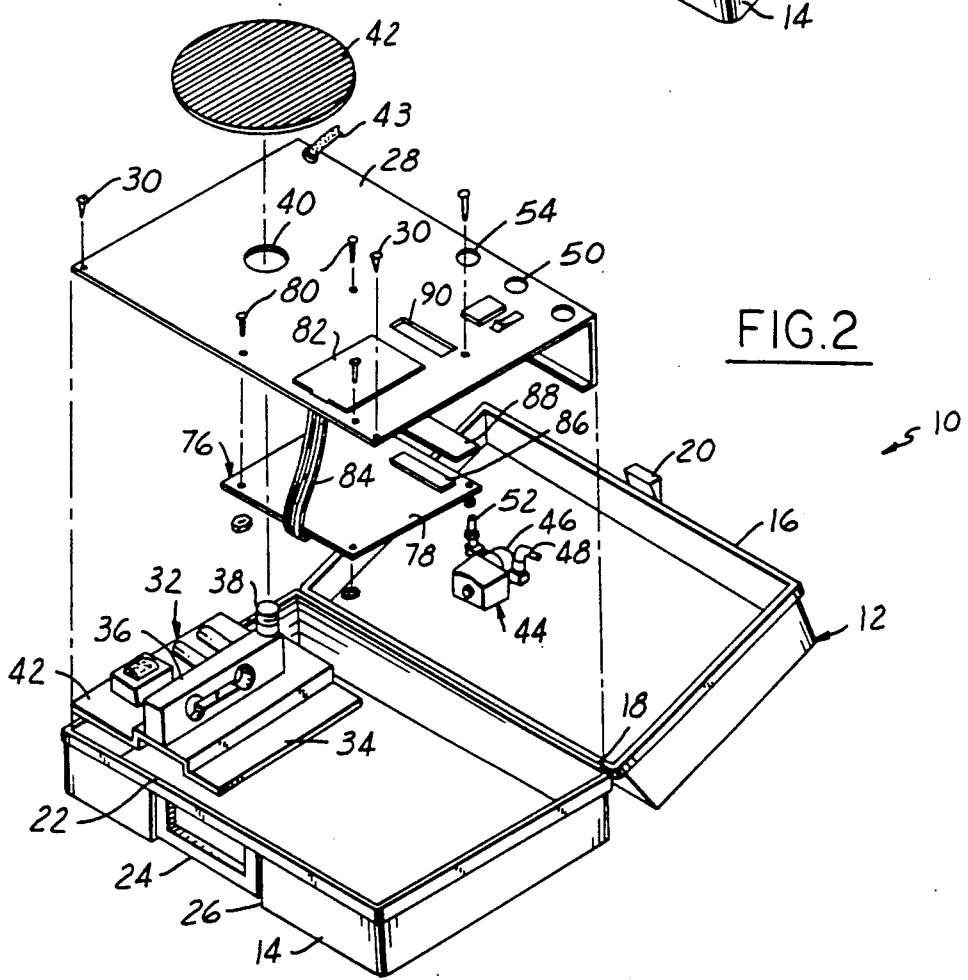
FIG. 2 is an exploded perspective view of the scale illustrated in FIG. 1.

FIGS. 1 and 2 illustrate a scale 10 in accordance with a presently preferred embodiment of the invention as comprising a rectangular enclosure 12 formed by a hollow rectangular base 14 and a hollow rectangular cover 16 joined to each other along adjacent side edges by an integral hinge flap 18. A latch 20 integrally extends from the edge of cover 16 opposite hinge 18, and is pivotal to engage the opposing lip 22 on base 14 for locking cover 16 in closed position. A handle 24 is centrally mounted on base 14 at the hinge-remote edge thereof, and is pivotal between a retracted position (FIG. 2) disposed within a pocket 26 in the adjacent sidewall of base 14 and an extended position (FIG. 1) for grasping by an operator to transport scale 10. In an working embodiment of the invention, enclosure 12, excluding handle 24, is of one-piece integral molded plastic construction.

A panel 28 is mounted by screws 30 over base 14 generally in the plane of the upper or open edge of the base so as to form an enclosed base volume. A scale 32 includes a support 34 mounted in base 14 and a beam 36 horizontally rigidly cantilevered from support 34 beneath panel 28. An externally threaded post 38 extends upwardly from the support-remote end of beam 36 through an aperture 40 in panel 28, and a platform 42 is removably threaded onto post 38 so as to be suspended above panel 28 by beam 36. A power supply 42 is also mounted on support 34 beneath panel 28 and is coupled to a line cord 43 for connection to a suitable source of utility power. A microprocessor-based controller 76 includes a printed circuitboard assembly 78 mounted by screws 80 beneath panel 28. An alphanumeric keypad 82 is carried by panel 28 and is connected by a multiple-conductor ribbon cable 84 to circuit assembly 78. An alphanumeric digital LCD 86 is carried by circuit assembly 78 at a position to be visible through a transparent screen 88 and an aperture 90 in panel 28. An on/off power switch 89 and an electrical outlet 91 are carried by panel 28 above display 86.

Figure 4:
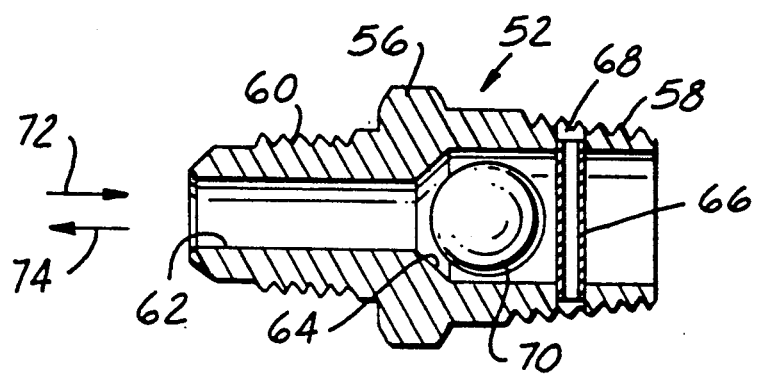
FIG. 4 is a sectional view of the check valve illustrated schematically in FIG. 3.

A valve assembly 44 is mounted beneath panel 28. Valve assembly 44 includes a solenoid valve 46 connected to an outlet fitting 48 that projects upwardly through an aperture 50 in panel 28. A check valve 52 is connected to the inlet port of solenoid valve 46, and projects upwardly through an aperture 54 in panel 28. The ends of fitting 48 and check valve 52, disposed above panel 28, have male threads for connection to refrigerant hoses as will be described hereinafter. Check valve 52 is illustrated in detail in FIG. 4 as comprising a generally tubular fitting 56 having axially aligned external male threads 58, 60 at opposed ends thereof. A passage 62 extends through fitting 56, with a conical shoulder 64 being formed about midway between the fitting ends. A pin 66 extends diametrically across the enlarged portion of passage 62, being press fitted into a diametric passage 68 adjacent to the fitting end. A ball valve element 70 is movably captured between shoulder 64 and pin 66, with the diameter of ball valve element 70 being less than the diameter of surrounding passage 62 but greater than the diameter of shoulder 64. Thus, flow of refrigerant in the direction 72 urges element 70 against pin 66, so that refrigerant may flow around the valve element through the check valve. On the other hand, refrigerant pressure in the direction 74 urges element 70 against shoulder 64, and thus blocks flow of refrigerant in that direction.

Figure 3:
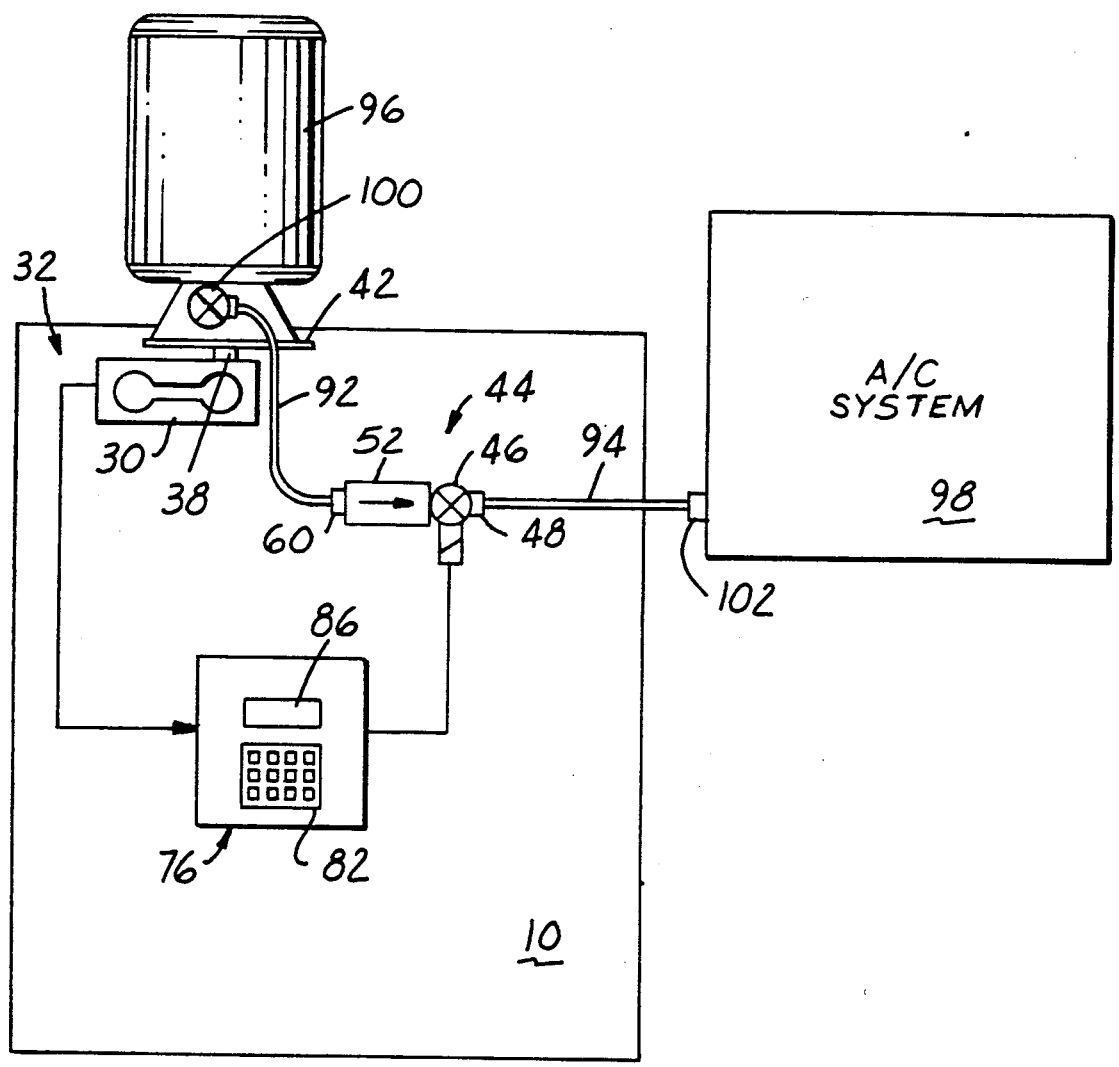
FIG. 3 is a schematic diagram of the refrigerant scale, illustrated in FIGS. 1 and 2.
Figure 5:
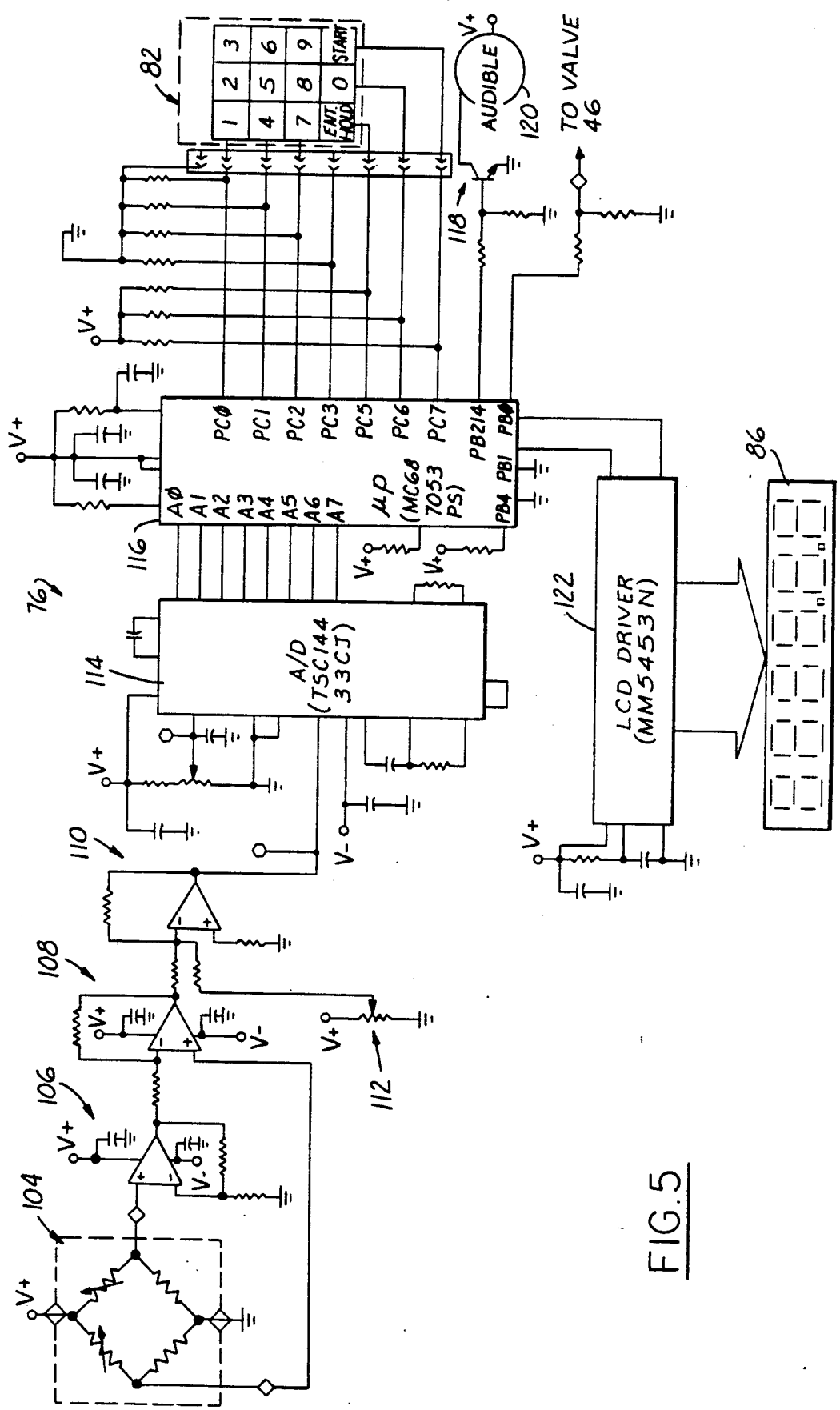
FIG. 5 is a function block diagram of the scale control electronics.

FIG. 3 illustrates scale 10 connected by refrigerant hoses 92, 94 to transfer refrigerant from a storage container or tank 96 carried by platform 42 to a refrigeration system 98 under service. Specifically, hose 92 is connected between a manual valve 100 on container 96 and threads 60 on check valve 52. Check valve 52 is polarized to transfer refrigerant from threads 60 toward threads 58, which are received in the inlet port of solenoid valve 46. Hose 94 is received on outlet fitting 48 of solenoid valve 46 and extends to a fitting 102 on refrigeration equipment 98. FIG. 5 is an electrical schematic diagram of scale controller 76. A strain gage sensor 104 mounted on scale beam 38 (FIGS. 2 and 3) is connected through a pair of amplifiers 106, 108 to an amplifier 110. Amplifier 110 also receives an input from a variable resistor 112 for factory adjustment of sensor signal offset. The output of amplifier 110 is fed through an A/D converter 114 to the data inputs of a control microprocessor 116. Microprocessor 116 also receives inputs from keypad 82, which includes numeric keys "0" through "9" and control keys "START" and "ENT./HOLD". The outputs of microprocessor 116 are connected through a buffer amplifier 118 to an audible alarm 120, to solenoid valve 46 (FIGS. 1-3), and through an LCD driver 122 to display 86.

In general operation, controller 76 is responsive to electrical scale signals from strain gage 104 to transfer a weight of refrigerant preprogrammed at keypad 82 through valve assembly 44 to refrigeration equipment 98. Controller 76 automatically opens solenoid valve 46 upon initiation of a transfer operation and automatically closes valve 46 when the preprogrammed weight of refrigerant has been transferred. Check valve 52 prevents reverse flow of refrigerant from equipment 98 to container 96. Scale 10 may also be configured to recover used refrigerant from equipment 98 by connecting hose 94 (FIG. 3) to threads 60 and hose 92 to fitting 48. Solenoid valve 46 may than be operated, either manually or automatically, for transferring refrigerant to container 96, with scale 32 functioning to ensure that container 96 is not overfilled. Operation of scale 10 will be discussed in greater detail in connection with FIGS. 6A—6F.

FIGS. 6A—6F together comprise a flowchart that illustrates operator activity (phantom lines) and programmed operation (solid lines) of automatic microprocessor-based controller 76 and scale 10 in accordance with a presently preferred embodiment of the invention. Upon initial application of power (FIG. 6A), a series of dashes is displayed at LCD 86, followed by display of "GO" when the unit is in standby ready for operation. The operator must then select between a scale mode of operation for weighing anything placed on scale platform 42 by depression of the "0" key at pad 82, a charging mode operation by depression of the "ENT/HOLD" key, or a recovery mode of operation (FIG. 6E) by depression of the "1" or "2" key. In a weighing mode of operation, display 86 initially reads "0.0", and thereafter displays the weight of whatever is placed on platform 42 (up to the scale limit), such as the weight of refrigerant in a container from which refrigerant is to be charged into the equipment under service. The operator then chooses between a manual mode of operation for manual transfer of refrigerant from the container on scale platform 42, or an automatic mode of operation for transfer of refrigerant. If neither mode of operation is selected, the controller returns to the standby mode.

Figure 6A:
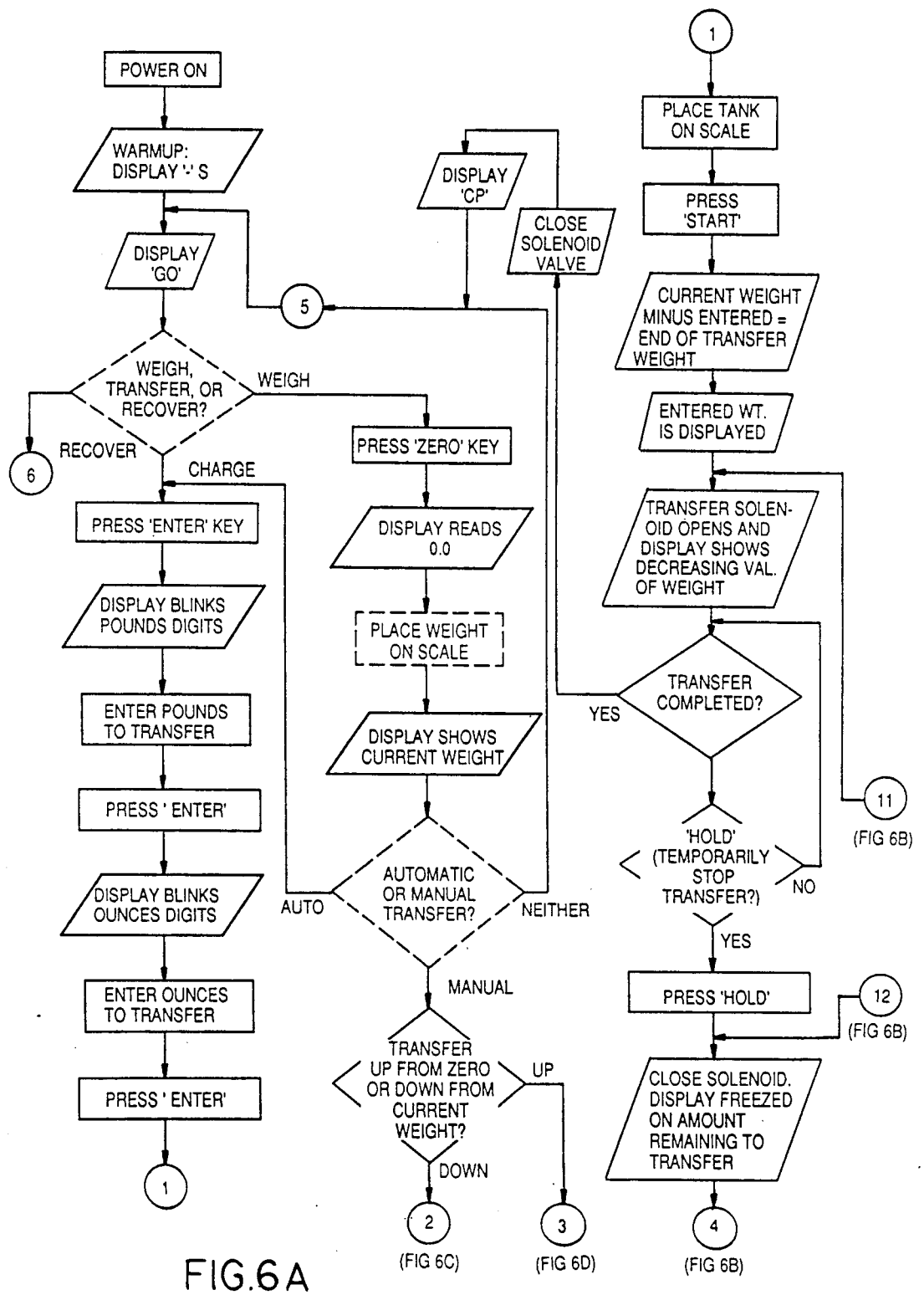
FIGS. 6A—6F together comprises a flowchart that illustrates programmed operation of the refrigerant scale in accordance with the presently preferred embodiment of the invention.
Figures 6B, 6F:
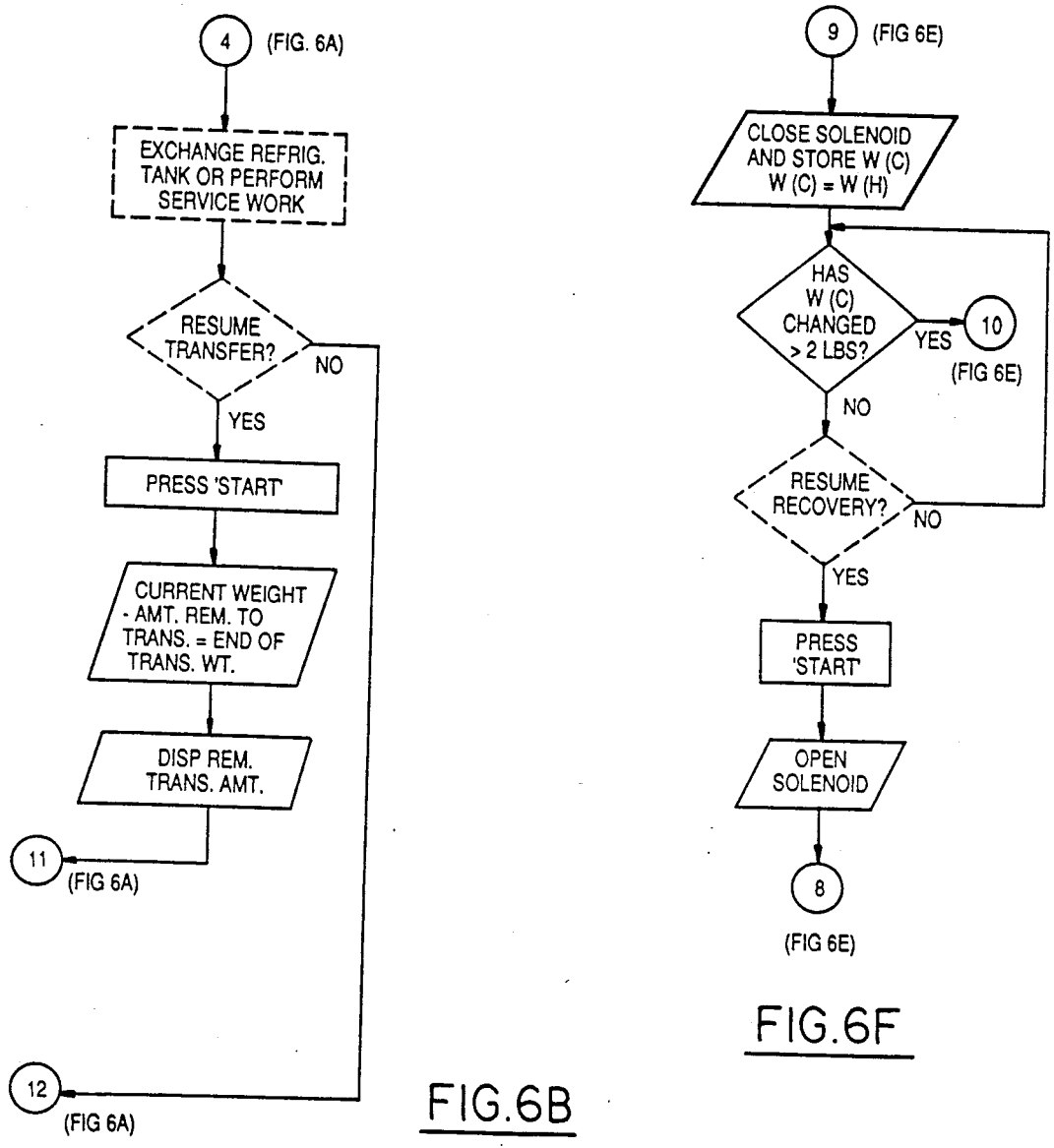
Figure 6C:
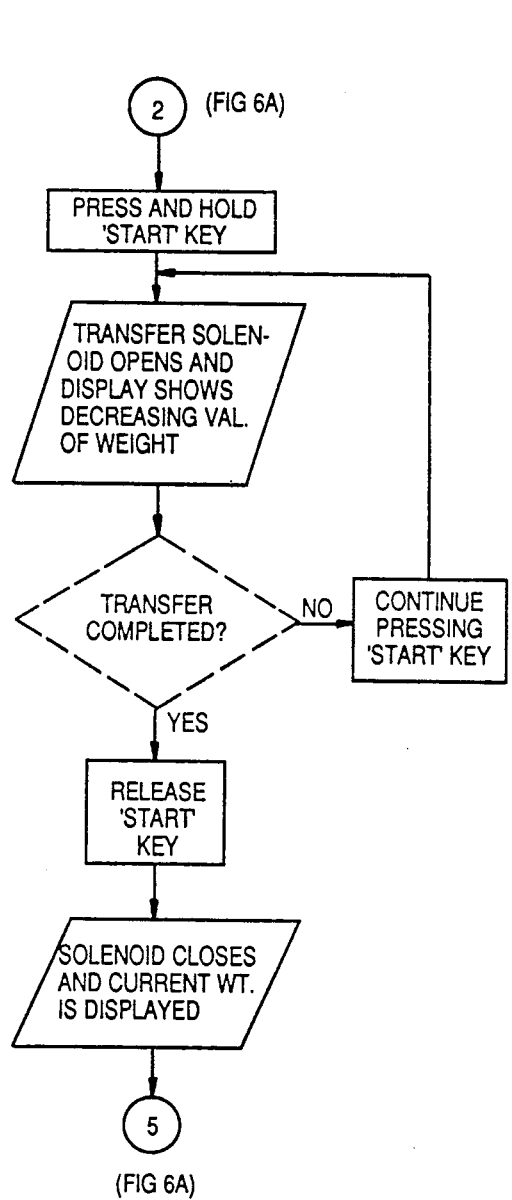

Considering next the automatic mode of operation selected by depression of the "ENT/HOLD" key, display 86 reverts to "0" lbs. "0.0" oz. after each anyslete transfer or powerdown. The operator may then enter a new charge quantity at keypad 82. The desired number of pounds is first entered at keypad 82 and loaded into memory by depression of the "ENT./HOLD" key. The desired number of ounces to the nearest half ounce is then similarly entered. A refrigerant tank is then placed on scale platform 42, and hoses 92, 94 are connected as shown in FIG. 3. Upon depression of the "START" key at pad 82, an end-of-transfer weight is computed by subtracting the programmed charge weight from the current weight reading of scale 32 and sensor 104, and the programmed charge weight is displayed at LCD 86. Solenoid valve 46 is then opened, and the weight displayed at LCD 86 is thereafter decremented as a function of the scale signals. When the current weight is equal to the previously-computed end-of-transfer weight, a completed transfer operation is indicated by display of the letters "CP" at LCD 86, solenoid valve 46 is closed, and the scale returns to the standby mode operation. If at anytime the operator desires to interrupt charge transfer, this maybe accomplished by depression of the "HOLD" key, which closes the solenoid valve and freezes the display at LCD 86. The operator may then change refrigerant tanks or perform other service work (FIG. 6B). The scale remains in the charge-interrupted mode until redepression of the "START" key (FIG. 6B), whereupon a new end-of-transfer weight is computed, remaining weight to be transferred is displayed at LCD 86, and operation returns to the automatic mode (FIG. 6A).

Figure 6D:
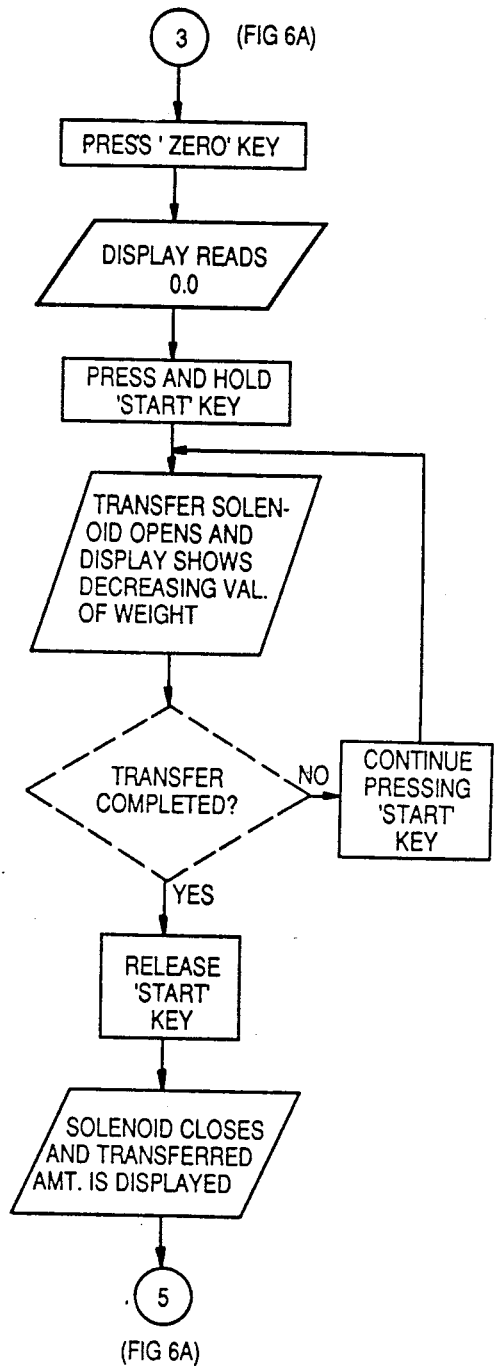
Figure 6E:
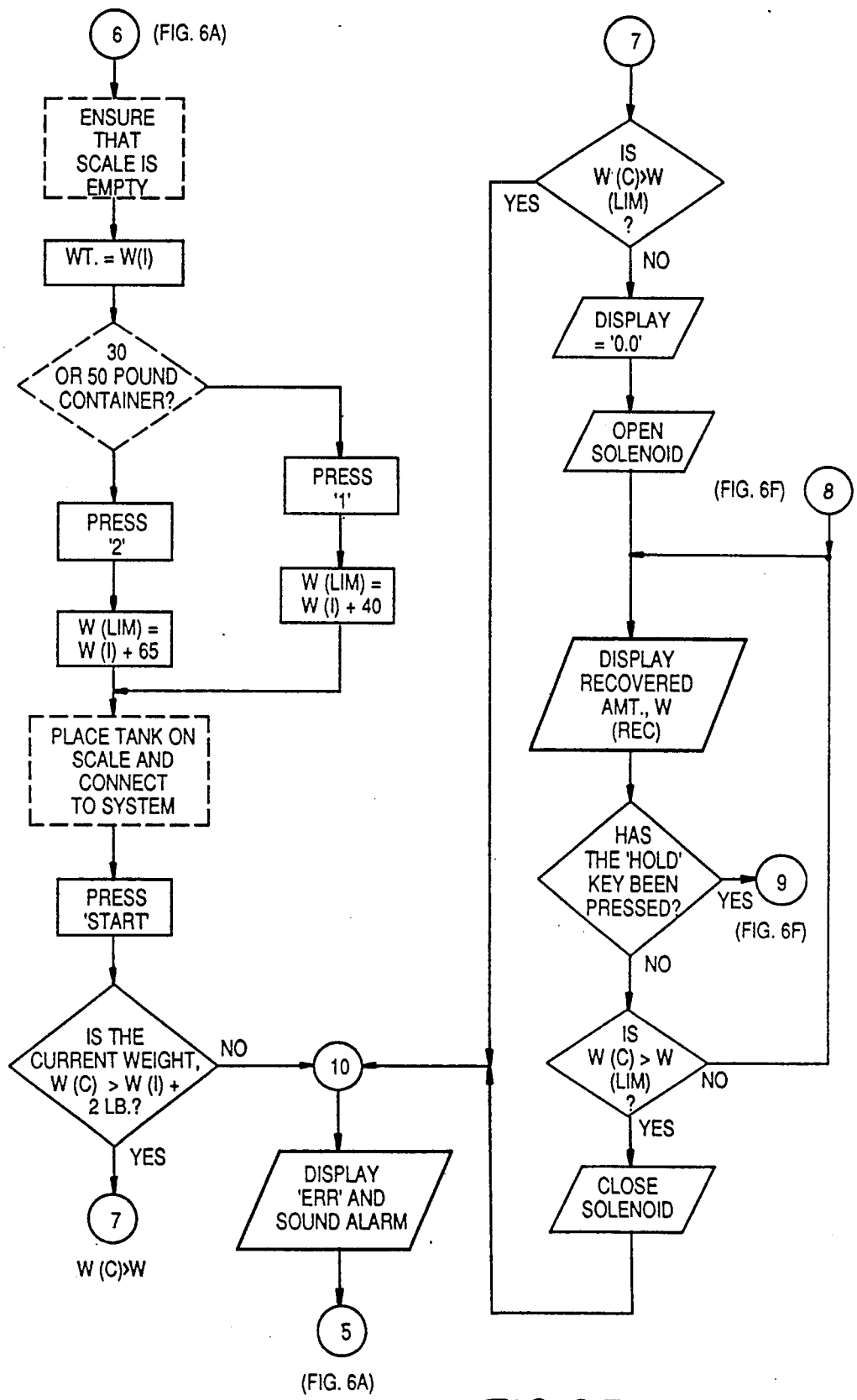

If manual operation is desired (FIG. 6A), the operator may choose between a LCD reading that decrements from current weight in the refrigerant container by depression of the "START" key (in FIG. 6C), or a display that increments upward from "0.0" by depression of the "0" key (FIG. 6D). If a decrementing display is chosen (FIG. 6C), valve 46 is opened and the display decrements as refrigerant is transferred. This operation is continued until the operator decides that sufficient refrigerant has been transferred, whereupon the "START" key is released, solenoid valve 46 is closed, current weight on the scale platform 42 is displayed, and the unit returns to the standby mode of operation (FIG. 6A). A similar operation takes place in the manual incrementing-display mode of operation (FIG. 6D), with the charge being manually transferred and the display correspondingly incrementing as along as the operator continues to depress and hold the "START" key.

If a recovery mode of operation is selected (FIG. 6A) while the unit is in standby, the initial scale weight W(I) (FIG. 6E) is stored by the controller and becomes the reference weight from which overfill limits are calculated and compared. (The operator must ensure that the scale is empty at this time.) The operator then selects between use of a 30 pound container by depression of the "1" key, whereupon the overfill limit W(LIM) is set at the empty-scale reading W(I) plus 40 pounds, or use of a 50 pound container by depression of the "2" key whereupon the limit W(LIM) is set equal to the empty-scale reading W(I) plus 65 pounds. A tank (either empty or partially filled) is then placed on scale 32, equipment 98 (FIG. 3) is connected by hose 94 to valve end 60, and container 96 is connected by hose 92 to fitting 48. Upon depression of the "START" key (FIG. 6E), the current scale reading W(C) is checked to ensure that it exceeds the initial reading W(I) by at least 2 pounds. If the weight has increased, it is assumed that such increase represents placement of a container on the scale, and operation proceeds. On the other hand if the weight on the scale has not increased by at least 2 pounds the error message "ERR" is displayed at LCD 86, alarm 120 (FIG. 5) is sounded and the unit returns to the standby mode of operation (FIG. 6A). The control electronics also ensures that the current reading W does not exceed the limit reading W(LIM), in which event an error message is displayed and the unit returns to standby. Otherwise, display 86 is set to "0.0" solenoid 46 is opened, and refrigerant is permitted to transfer from the refrigeration equipment 98 (FIG. 3) to container 96. This operation continues, with the displayed weight being incremented to follow actual scale weight. If the scale reading exceeds the limit reading the solenoid is closed and the error message is indicated.

If at anytime during a recovery operation the operator decides to interrupt operation, the "HOLD" key is depressed (FIG. 6E), and operation transfers to the recovery-hold routing illustrated in FIG. 6F. The solenoid valve is closed and the current scale reading is stored. The operator may then perform any service work required, but may not change tanks. During the hold routine, the control electronics continuously monitors the scale weight. If the scale weight change more then two (2) pounds during "HOLD", the message "ERR" is displayed at LCD 86, alarm 120 (FIG. 5) is sounded, and the unit returns to the standby mode of operation (FIG. 6A). This is a safety feature to ensure that the operator must reprogram the unit with any change of tanks. If there is no significant weight change during "HOLD", the operator may resume the recovery by depressing the "START" key.

We claim:

1. An electronic scale assembly for transferring refrigerant charge between a tank and refrigeration equipment that comprises:
   an enclosure including handle means positioned along one side edge of said enclosure for manually transporting said enclosure, and a cover for selectively opening and closing said enclosure.
   a scale including a platform mounted within said enclosure at a position to support a refrigerant tank when said cover is disposed to open said enclosure, and means for providing an electrical signal as a function of weight supported by said platform.
   a transfer valve and means including hose fittings for connecting said transfer valve between a tank mounted on said scale and refrigeration equipment for selectively transferring refrigerant between the tank and equipment through said valve, and
   electronic control means responsive to said electrical signal for indicating weight of refrigerant transferred through said transfer valve,
   said enclosure comprising an open rectangular base, means mounting said scale, and said transfer valve, said electronic control means and said indicating means within said base, said cover being open and rectangular, hinge means interconnecting said cover and said base, and latch means for selectively fastening said cover in a closed function to said base,
   said electronic control means comprising a microprocessor-based controller and an alphanumeric keypad for operator entry of information into said controller, and said mounting means comprising a panel enclosing said scale, said controller and said transfer valve within said base with said keypad and said indicating means being carried in exposed position on said panel, with said scale platform being positioned above said panel, and with said fittings protruding through apertures in said panel for connecting said transfer valve to refrigerant hoses.

2. The scale set forth in claim 1 further comprising a check valve for preventing reverse flow of refrigerant between the refrigeration equipment and the tank, said check valve being mounted on said transfer valve beneath said panel and having one end protruding through said panel as one of said fittings.

3. The scale set forth in claim 2 wherein said check valve comprises a hollow fitting having a passage extending therethrough, means forming a reduction in said passage, pin means extending across said passage at a position spaced from said reduction, and a ball valve element movably captured between said reduction and said pin means, said reduction being contoured to form a seat for said element.

4. The scale set forth in claim 2 wherein said valve-connecting means comprises hoses that include couplings for selectively connecting said transfer valve and said check valve between the tank and the refrigeration equipment for transferring refrigerant from the tank to charge the equipment or transferring refrigerant to the tank to recover refrigerant from the equipment.

5. An electronic scale assembly for transferring refrigerant between a tank and refrigeration equipment that comprises:
   an enclosure including an open rectangular base, a handle positioned along one side edge of said base for transporting said enclosure, a cover for selectively opening and closing said enclosure, hinge means interconnecting said cover and said base, and a panel enclosing said base,
   a scale including a platform positioned above said panel to support a refrigerant tank when said cover is disposed to open said enclosure, and means positioned within said base beneath said panel and coupled to said platform for providing an electrical signal as a function of weight supported by said platform,
   a refrigerant transfer solenoid valve positioned beneath said panel within said base and having fittings accessible through said panel for connecting said valve between a tank mounted on said scale and refrigeration equipment for selectively transferring refrigerant between the tank and equipment through said valve, and
   electronic control means including a microprocessor-based controller mounted within said base beneath said panel, an alphanumeric keypad on said panel for operator entry of information into said controller, and an alphanumeric display on said panel coupled to said controller for indicating refrigerant transfer quantity;
   said controller including means responsive to depression of a first selected key on said keypad for opening said valve and transferring refrigerant between the tank and the equipment independently of said electrical signal as long as said first selected key is depressed, and means responsive to release of said first selected key for closing said valve.

6. The scale set forth in claim 5 wherein said controller further includes means responsive to said keypad for selection between programming and transfer modes of operation, means for programming a selected charge transfer quantity into said controller in said programming mode of operation, means in said transfer mode of operation for opening said valve, monitoring said electrical signal, automatically closing said valve responsive to a change in said electrical signal corresponding to said quantity and continuously displaying refrigerant quantity at said display, means in said transfer mode of operator responsive to operator activation of a second selected key on said keypad for arresting said transfer mode of operation, closing said valve and freezing said display, and thereafter resuming said transfer mode of operation without charging said display.

7. The scale set forth in claim 5 further comprising means responsive to said electrical signals for selectively incrementing or decrementing said display as a function of refrigerant transferred as said first selection key is depressed.

8. The scale set forth in claim 7 wherein said check valve comprises a hollow fitting having a passage extending therethrough, means forming a reduction in said passage, pin means extending across said passage at a position spaced from said reduction, and a ball valve element movably captured between said reduction and said pin means, said reduction being contoured to form a set for said element.

9. The scale set forth in claim 8 wherein said valve-connecting means comprises hoses that include couplings for selectively connecting said transfer valve and said check valve between the tank and the refrigeration equipment for transferring refrigerant from the tank to charge the equipment or transferring refrigerant to the tank to recover refrigerant from the equipment.

10. The scale set forth in claim 5 wherein said scale comprises a support within said enclosure, a beam cantilevered from said support, said platform being carried at the support-remote end of said beam, and strain gauge sensing means carried by said beam for providing said electrical signal as a function of stress in said beam.

11. The scale set forth in claim 5 further comprising a check valve for preventing reverse flow of refrigerant between the refrigeration equipment and the tank, said check valve being mounted on said transfer valve beneath said panel and having one end protruding through said panel as one of said fittings.

* * * * *